United States Patent
Ringler (10) Patent No.: US 11,501,017 B2
(45) Date of Patent: Nov. 15, 2022

(54) METHOD AND DEVICES FOR RECORDING DATA AND DOCUMENTS FOR A PERSON

(71) Applicant: Ringler Informatik AG, Baar (CH)

(72) Inventor: Marcel Ringler, Unterägeri (CH)

(73) Assignee: RINGLER INFORMATIK AG, Baar (CH)

(*) Notice: Subject to any disclaimer, the term of this patent is extended or adjusted under 35 U.S.C. 154(b) by 367 days.

(21) Appl. No.: 16/604,069

(22) PCT Filed: Mar. 13, 2018

(86) PCT No.: PCT/EP2018/056284
§ 371 (c)(1),
(2) Date: Oct. 9, 2019

(87) PCT Pub. No.: WO2018/188873
PCT Pub. Date: Oct. 18, 2018

(65) Prior Publication Data
US 2021/0117565 A1 Apr. 22, 2021

(30) Foreign Application Priority Data
Apr. 10, 2017 (CH) .................................. 00480/17

(51) Int. Cl.
*G06F 21/62* (2013.01)
*G06F 21/36* (2013.01)
(Continued)

(52) U.S. Cl.
CPC .......... *G06F 21/6245* (2013.01); *G06F 21/36* (2013.01); *G06F 21/602* (2013.01); *H04L 9/3263* (2013.01)

(58) Field of Classification Search
CPC .... G06F 21/602; G06F 21/36; G06F 21/6245; H04L 9/3263
(Continued)

(56) References Cited

U.S. PATENT DOCUMENTS

| 2002/0111960 A1* | 8/2002 | Irons | H04N 1/2166 |
| 2007/0211288 A1* | 9/2007 | Uejo | H04N 1/32122 358/1.16 |

(Continued)

OTHER PUBLICATIONS

Zhu, Xiaoling, et al. "Secure and Efficient Mobile Payment Using QR Code in an Environment with Dishonest Authority." International Conference on Security, Privacy and Anonymity in Computation, Communication and Storage. Springer, Cham, 2016. (Year: 2016).*

(Continued)

*Primary Examiner* — Syed A Zaidi
(74) *Attorney, Agent, or Firm* — Knobbe, Martens, Olson & Bear, LLP (57) ABSTRACT

In a computer system (1), generated (S2) is a visual code which encodes reference information for identifying a data object linked to a person. Using a camera of a mobile communication device (2), the reference information encoded in the visual code is captured from a visual representation of the visual code and stored (S5) in the mobile communication device (2). In the mobile communication device (2), generated (S8) is a data package which includes the captured reference information and an image (23) of a document (4) of the person. The data package is transferred (S9) from the mobile communication device (2) to the computer system (1). In the computer system (1), the image of the document (4) is stored (S11) linked to the data object (10), defined by the reference information received in the data package.

15 Claims, 3 Drawing Sheets

(51) Int. Cl.
G06F 21/60 (2013.01)
H04L 9/32 (2006.01)

(58) Field of Classification Search
USPC .......................................................... 726/26
See application file for complete search history.

(56) References Cited

U.S. PATENT DOCUMENTS

| | | | | |
|---|---|---|---|---|
| 2012/0089518 | A1* | 4/2012 | Blonchek | H04W 12/06 |
| | | | | 705/50 |
| 2012/0215669 | A1* | 8/2012 | Lieberman | G06Q 40/123 |
| | | | | 235/494 |
| 2012/0261465 | A1 | 10/2012 | Vasquez et al. | |
| 2013/0054271 | A1* | 2/2013 | Langford | G16H 10/60 |
| | | | | 705/3 |
| 2015/0012339 | A1* | 1/2015 | Onischuk | G07C 13/00 |
| | | | | 235/386 |
| 2015/0358163 | A1* | 12/2015 | Carter | G06F 21/645 |
| | | | | 713/179 |
| 2016/0217217 | A1 | 7/2016 | Boudville | |
| 2016/0300234 | A1* | 10/2016 | Moss-Pultz | G06F 21/64 |
| 2016/0308855 | A1* | 10/2016 | Lacey | H04L 63/10 |
| 2018/0280245 | A1* | 10/2018 | Khalid | A61J 7/0481 |

OTHER PUBLICATIONS

NPL Search Terms (Year: 2021).*
NPL Search Terms (Year: 2022).*
International Search Report and Written Opinion of the International Searching Authority for International Application No. PCT/EP2018/056284, dated Apr. 5, 2018, in 15 pages.
McCune et al., "Seeing-Is-Believing: Using Camera Phones for Human-Verifiable Authentication," Proceedings of the 2005 IEEE Symposium on Security and Privacy, Oakland, CA, USA, May 8-11, 2005, Piscataway, NJ, USA, IEEE, pp. 110-124, XP010798367 (May 8, 2005).

* cited by examiner

METHOD AND DEVICES FOR RECORDING DATA AND DOCUMENTS FOR A PERSON

CROSS-REFERENCE TO RELATED APPLICATIONS

This application is the U.S. National Phase under 35 U.S.C. § 371 of International Application PCT/EP2018/056284, filed Mar. 13, 2018, which claims priority to CH Application No. 00480/17, filed Apr. 10, 2017, the entire contents of each of which are incorporated by reference herein and made a part of this specification.

FIELD OF THE INVENTION

The present invention relates to a method and devices for recording data and documents for a person. Specifically, the present invention relates to a computer-implemented method, a computer system, a mobile communication device, and computer program products for recording data and documents for a person.

BACKGROUND OF THE INVENTION

Very early in their development, computers have been used to record (enter and store) data assigned to a person. For that purpose, data objects have been linked in the computer to a person identifier defining the person, e.g. a unique numeric or alphanumeric code, a biometric record, and/or another code that uniquely identifies the respective person. Further developments of computers and computer peripheral devices, such as scanners or digital cameras, made it possible to generate electronic representations of paper documents and to store these electronic document representations in the computers linked to a person. In applications and scenarios where the computer is operated by a service provider who is separate and remote from the person, paper documents of the person could be sent by paper mail to the service provider where the paper documents were converted (scanned, imaged) to electronic representations of the documents and stored in the computer system. However, depending on the circumstances, linking the documents in the computer to the proper person was not always possible, for example, the documents could not be properly and non-ambiguously assigned to the right person, or several documents were simply mixed up. In applications where the documents originated at the service provider, e.g. (non-anonymous) questionnaires, forms, tax returns, and the like, this problem could be avoided in that the service provider printed a person identifier onto the paper documents, e.g. before the paper documents were mailed to the person. When, at a later point in time, the paper documents were returned to the service provider, the person identifier printed on the paper documents made it possible for the service provider to assign the paper documents to the proper person and to store the electronic representation of the respective document in the computer linked to the corresponding person identifier. For paper documents that do not originate at the service provider, the approach of printing a person identifier onto the paper documents is neither practical nor feasible.

SUMMARY OF THE INVENTION

It is an object of this invention to provide a computer-implemented method and devices for recording data and documents for a person, which method and devices do not have at least some of the disadvantages of the prior art. In particular, it is an object of the present invention to provide a computer-implemented method and devices for recording for a person documents which have not printed thereon a unique person identifier.

According to the present invention, these objects are achieved through the features of the independent claims. In addition, further advantageous embodiments follow from the dependent claims and the description.

In a computer-implemented method of recording data and documents for a person, a data object is linked in a computer system to a person identifier of the person.

According to the present invention, the above-mentioned objects are particularly achieved in that a visual code is generated in the computer system. The visual code encodes reference information for identifying the data object linked to the person. A visual representation of the visual code is generated. Using a camera of a mobile communication device, the reference information encoded in the visual code is captured from the visual representation of the visual code. The reference information is stored in the mobile communication device. A data package is generated in the mobile communication device. The data package includes the reference information captured from the visual representation of the visual code and an image of a document of the person. The data package is transferred from the mobile communication device to the computer system. The image of the document, received in the data package, is stored in the computer system linked to the data object, defined by the reference information received in the data package.

In an embodiment, generating the data package in the mobile communication device comprises encrypting at least a part of the data package using a public cryptographic key provided by the computer system.

In a further embodiment, generating the visual code in the computer system comprises encoding in the visual code a public cryptographic key. The public cryptographic key encoded in the visual code is stored in the mobile communication device.

In an embodiment, generating the visual code in the computer system comprises encoding in the visual code an addressing element. Using the addressing element, the data package is transferred from the mobile communication device to the computer system.

In a further embodiment, transferring the data package from the mobile communication device to the computer system comprises transmitting the data package from the mobile communication device to a cloud-based processing center, and transmitting the data package from the cloud-based processing center to the computer system.

In an embodiment, the image of the document of the person is captured, using a camera of the mobile communication device and/or a scanner. The image of the document of the person is stored in the mobile communication device.

In a further embodiment, generating the visual representation of the visual code comprises displaying the visual representation and/or printing the visual representation of the visual code.

In addition to the computer-implemented method of recording data and documents for a person, the present invention also relates to a computer system for recording data and documents for a person. The computer system comprises one or more processors which are configured to perform the steps of: linking in the computer system a data object to a person identifier of the person; generating in the computer system a visual code, the visual code encoding reference information for identifying the data object linked to the person; generating a visual representation of the visual code to enable a mobile communication device to capture the reference information encoded in the visual code, using a camera of the mobile communication device; receiving in the computer system a data package from the mobile communication device; extracting in the computer system from the data package an image of a document of the person and the reference information extracted by the mobile communication device from the visual representation of the visual code; and storing in the computer system the image of the document, extracted from the data package, linked to the data object, defined by the reference information extracted from the data package.

In an embodiment, the one or more processors of the computer system are further configured to use a private cryptographic key of the computer system to decrypt contents of the data package encrypted by the mobile communication device using a public encryption key of the computer system.

In a further embodiment, the one or more processors of the computer system are further configured to encode in the visual code the public cryptographic key of the computer system, enabling the mobile communication device to encrypt at least a part of the data package using the public cryptographic key of the computer system.

In addition to the computer-implemented method and the computer system for recording data and documents for a person, the present invention also relates to a computer program product comprising a non-transient computer-readable medium having stored thereon computer program code configured to control a processor of a computer system such that the computer system performs the steps of: linking in the computer system a data object to a person identifier of a person; generating in the computer system a visual code, the visual code encoding reference information for identifying the data object linked to the person; generating a visual representation of the visual code to enable a mobile communication device to capture the reference information encoded in the visual code, using a camera of the mobile communication device; receiving in the computer system a data package from the mobile communication device; extracting in the computer system from the data package an image of a document of the person and the reference information extracted by the mobile communication device from the visual representation of the visual code; and storing in the computer system the image of the document, extracted from the data package, linked to the data object, defined by the reference information extracted from the data package.

In addition to the computer-implemented method and the computer system for recording data and documents for a person, the present invention also relates to a mobile communication device, comprising a camera and a processor connected to the camera and configured to perform the steps of: capturing reference information, using the camera of the mobile communication device, from a visual representation of a visual code, generated by an external computer system separate from the mobile communication device for defining in the external computer system a data object linked to a person; generating in the mobile communication device a data package, the data package including the reference information captured from the visual representation of the visual code and an image of a document of the person; and transferring the data package from the mobile communication device to the external computer system, enabling the external computer system to store the image of the document of the person in the external computer system linked to the data object defined by the reference information included in the data package.

In an embodiment, the processor of the mobile communication device is further configured to encrypt at least a part of the data package using a public cryptographic key of the external computer system.

In a further embodiment the processor of the mobile communication device is further configured to extract the public cryptographic key of the external computer system from the visual representation of the visual code generated by the external computer system.

In addition to the mobile communication device, and the computer-implemented method and the computer system for recording data and documents for a person, the present invention also relates to a computer program product comprising a non-transient computer-readable medium having stored thereon computer program code configured to control a processor of a mobile communication device such that the mobile communication device performs the steps of: capturing reference information, using a camera of the mobile communication device, from a visual representation of a visual code, generated by an external computer system separate from the mobile communication device for defining in the external computer system a data object linked to a person; generating in the mobile communication device a data package, the data package including the reference information captured from the visual representation of the visual code and an image of a document of the person; and transferring the data package from the mobile communication device to the external computer system, enabling the external computer system to store the image of the document of the person in the external computer system linked to the data object defined by the reference information included in the data package.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

In FIGS. 1-5, reference numeral 1 refers to a computer system for recording data and documents 4 for a person. As illustrated schematically in FIGS. 1-4, the documents are paper documents, e.g. letters, invoices, receipts, statements of accounts, forms, etc. The computer system 1 comprises one or more operable computers which comprise one or more processors 13 and a data store 100 for storing person data. The person data comprises at least one data object 10 linked to a person identifier 11. The computer system 1 is configured for data communication via a communications network 3, e.g. with a remote user computer 5 or a mobile communication device 2. As shown in FIGS. 1-4, the computer system 1 comprises a display screen 14, e.g. for displaying a user interface of a data processing application. The computer system 1 further comprises a non-transitory computer-readable medium, connected to the processor(s) 13 removably or in a fixed fashion, and having stored thereon computer program code configured to control the processor(s) 13 such that the computer system 1 implements the data processing application and its user interface and performs various functions described below in more detail. The data processing application implemented by the processors 13 of the computer system 1 is configured to receive (via electronic data transmission, data entry, and/or data scanning processes) and store person data in one or more data objects 10 in the data store 100. For example, the data processing application is related to tax declarations or the processing of other person-specific data and documents. The data objects 10 include data files, electronic documents, electronic forms, databases, data folders, and data records, data elements and/or data fields in the data files, electronic documents, electronic forms, databases, and/or data folders, respectively.

The communications network 3 comprises a local area network (LAN), a wireless local area network (WLAN), a mobile radio network, e.g. a GSM (Global System for Mobile Communication) or UMTS (Universal Mobile Telephone System), a fixed telecommunications network, and/or the Internet.

As illustrated schematically in FIGS. 1-4, a cloud-based computer system 30 is connected to the communications network 3. The cloud-based computer system 30 comprises one or more operable computers with one or more processors connected to a data store.

As illustrated schematically in FIGS. 1-4, the mobile communication device 2 comprises a camera 20, a display 21 and one or more processors 22, connected to the camera 20 and the display 21. The mobile communication device 2 further comprises a non-transitory computer-readable medium, connected to the processor(s) 22 removably or in a fixed fashion, and having stored thereon computer program code configured to control the processor(s) 22 such that the mobile communication device 2 performs various functions described below in more detail.

Figure 5:
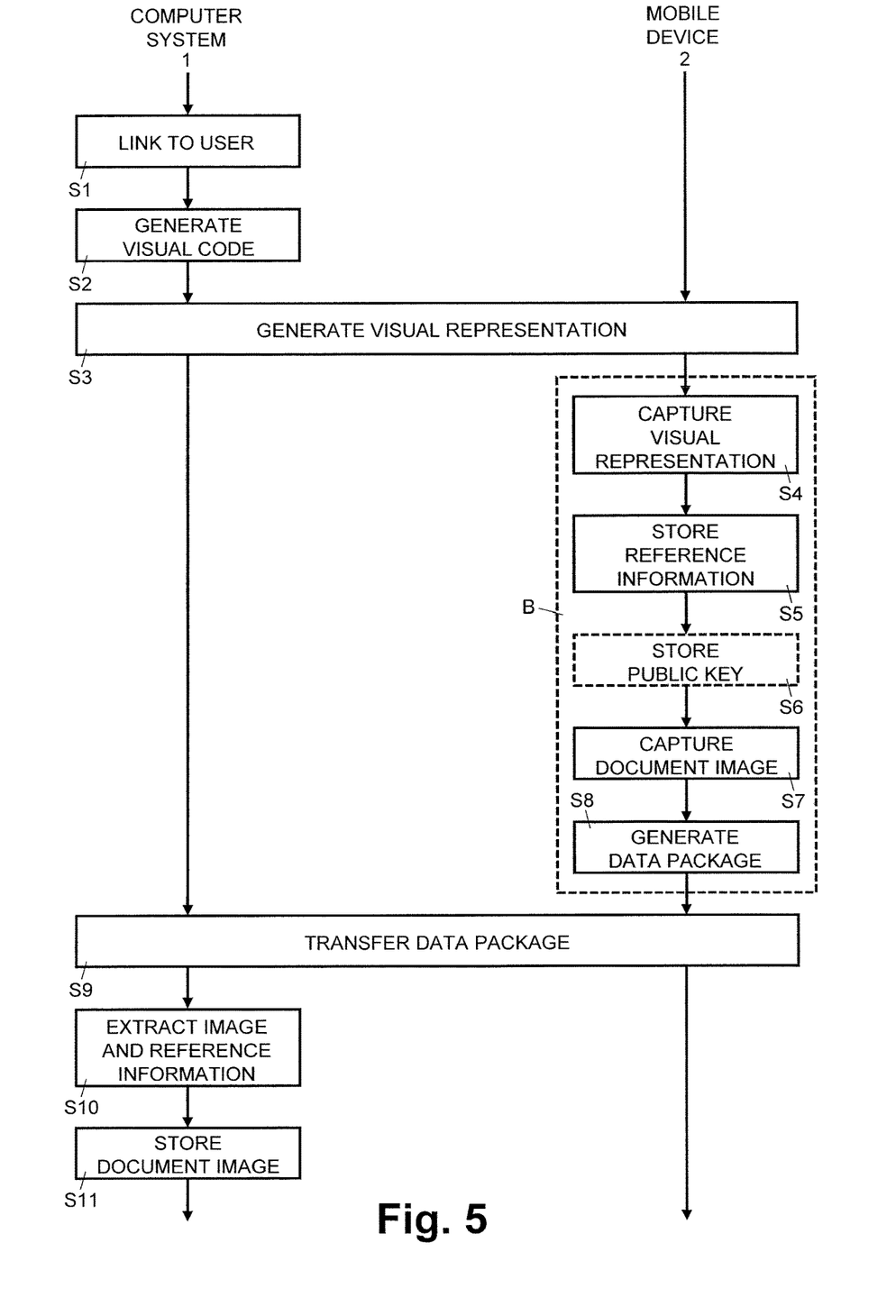
FIG. 5: shows a flow diagram illustrating an exemplary sequence of steps for recording in a computer system data and documents for a person.

In the following paragraphs, described with reference to FIG. 5 are possible sequences of steps performed by the processors 13, 22 of the computer system 1, mobile communication device 2, or cloud-based computer center 3, respectively, for recording data and documents 4 for a person. Recording data and documents 4 for a person means to store said data and documents of the person linked or assigned to the person. For the sake of clarity and ease of reading, steps performed by the processor(s) 13 of the computer system 1 or by the data processing application implemented by the processor(s) 13 of the computer system 1, respectively, are referred to as "steps performed by the computer system 1". Correspondingly, steps performed by the processor(s) 22 of the mobile communication device 2 or the cloud-based computer center 3 are referred to as "steps performed by the mobile communication device 2" or "steps performed by the cloud-based computer center 3", respectively.

In step S1, the computer system 1 links one or more data objects 10 comprising person data of a specific person to a person identifier of the specific person. Depending on the application, the person data includes data about the person, e.g. name, birth date, etc., data for contacting the person, e.g. address, phone number, etc., or other data related to the person, such as financial data, including income, account balances, expenses, pension contributions, etc., or other data associated with the person or his/her family. For example, the linking of the person data is responsive to data input or data entry for and related to the specific person. The person identifier is a unique person identifier defining the specific person in a non-ambiguous fashion, e.g. a social insurance number, a passport number, an IMSI (international mobile subscriber identifier), a unique identifier (UID), a globally unique identifier (GUID), or the like.

In step S2, the computer system 1 generates a visual code which encodes reference information for identifying the one or more data objects 10 linked to the person. Depending on the embodiment, configuration and/or type of data object 10, the reference information includes an object identifier (OID), a Uniform Resource Identifier (URI), a Uniform Resource Locator (URL), a bookmark, an anchor, a node identifier, or another addressing element for uniquely identifying the one or more data objects 10. The visual code or the reference information, respectively, further identifies the computer system 1 and/or the respective person. For example, the visual code is a one or two-dimensional bar code, e.g. a QR-code (Quick Response code), or another code that can be visualized on a display screen 14, 51, 21 or on paper 6 or another print medium.

In an embodiment, in step S2, the computer system 1 generates the visual code to further include a public cryptographic key of the computer system 1. The public cryptographic key is part of a public/private key pair for asymmetric cryptography, whereby the (secret) private key is stored securely in the computer system 1.

In a further embodiment, in step S2, the computer system 1 generates the visual code to further include an addressing element related to the cloud-based computer center 30. For example, the addressing element comprises a URL (Uniform Resource Locator) or another link to an application, a data package and/or a data store on the cloud-based computer center 30.

Figure 2:
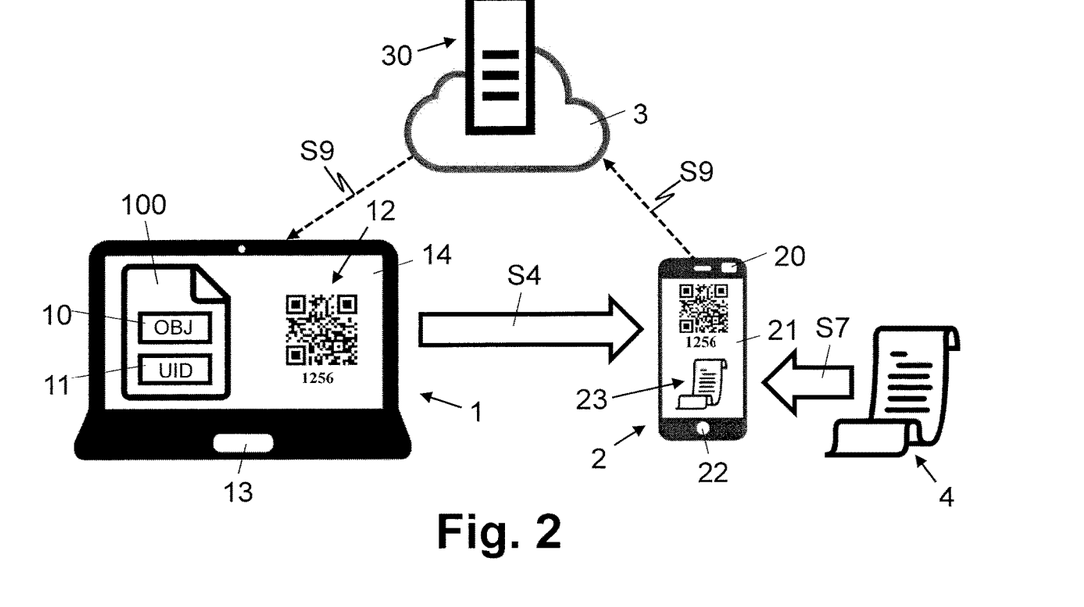
FIG. 2: shows a block diagram illustrating schematically a computer system which generates a visual representation of a visual code to enable a user to link the documents of a person to data stored for the person in the computer system.
Figure 3:
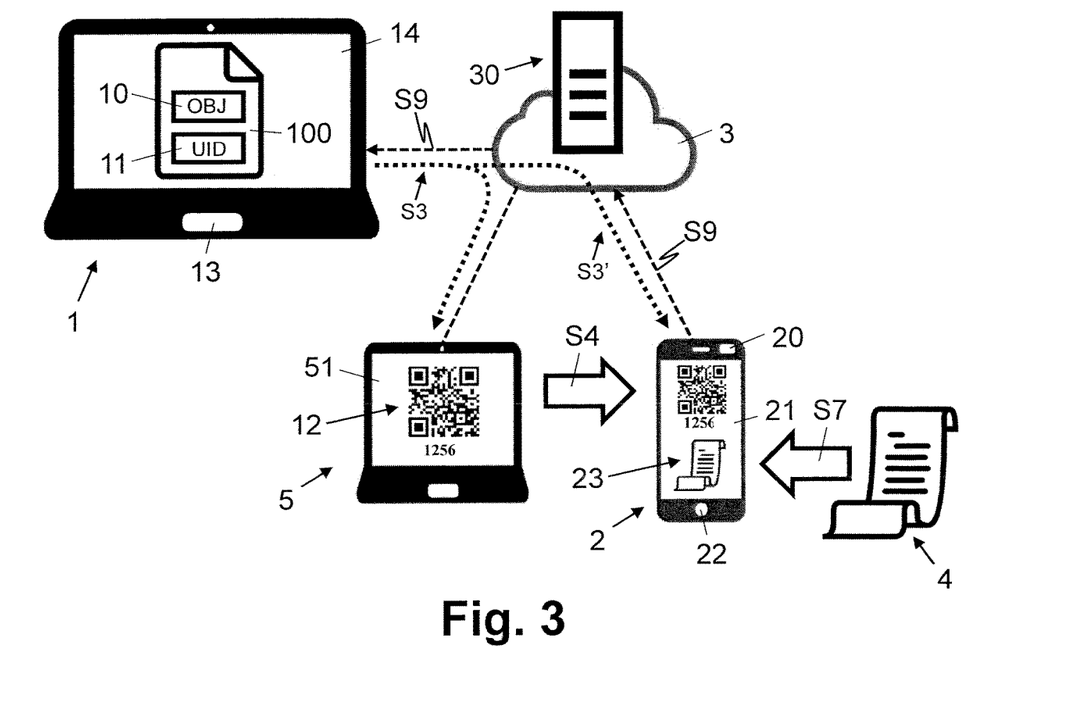
FIG. 3: shows a block diagram illustrating schematically a computer system which generates and transfer to a user computer a visual code, enabling the user to link the documents of a person to data stored for the person in the computer system.
Figure 4:
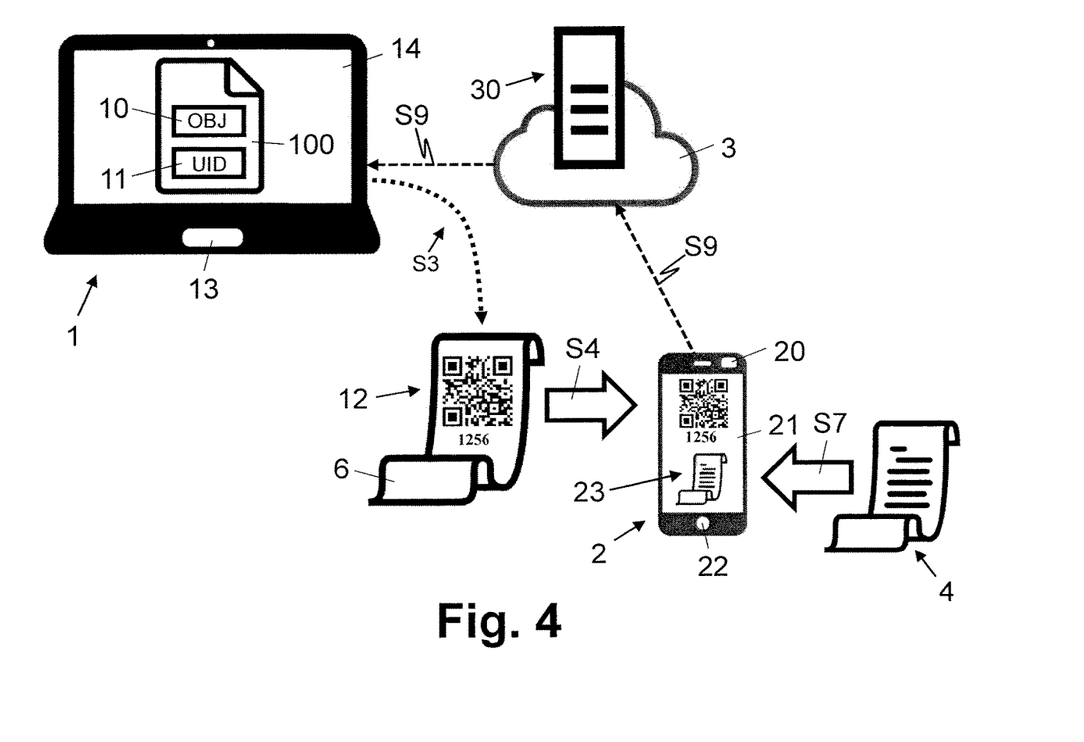
FIG. 4: shows a block diagram illustrating schematically a computer system which generates and prints for a user a visual code, enabling the user to link the documents of a person to data stored for the person in the computer system.

In step S3, a visual representation 12 of the visual code is generated. Depending on the scenario or configuration, the computer system 1 generates the visual representation 12 on a display 14 of the computer system 1, as illustrated in FIG. 2; the visual representation 12 is generated on a display 51 of a remote user computer 5, as illustrated in FIG. 3; or the visual representation 12 is printed by the computer system 1 (via a printer) on paper 6 or another print medium, as illustrated in FIG. 4.

In step S4, the visual representation 12 is captured by the mobile communication device 2. Specifically, the camera 20 of the mobile communication device 2 is used to capture the visual representation 12 by taking a picture and generating an image of the visual representation 12 shown on the display 14 of the computer system 1, on the display 51 of the user computer 5, or on the paper 6 or other print medium, respectively.

In step S5, the mobile communication device 2 extracts and stores the reference information encoded in the captured visual code.

Depending on the embodiment, in step S6, the mobile communication device 2 further extracts and stores the public cryptographic key of the computer system 1 and/or the addressing element encoded in the captured visual code.

In step S7, the mobile communication device 2 captures an image of one or more documents 4 of the person. Specifically, the camera 20 of the mobile communication device 2 is used to capture a document 4 by taking a picture and storing an image 23 of the document 4. Alternatively, the one or more documents 4 are captured by way of a scanner included in the mobile communication device 2 or connected to the mobile communication device 2.

In step S8, the mobile communication device 2 generates a data package which includes the reference information, extracted from the captured visual code, and the captured image 23 of the one or more documents 4 of the person. In an embodiment, the mobile communication device 2 uses the public cryptographic key, extracted from the captured visual code, to encrypt the contents of the data package, specifically, the reference information and the image 23 of the document(s) 4. In an embodiment, the reference information, particularly identification information defining the computer system 1 and/or the respective person, is further included in non-encrypted fashion.

In an embodiment, the steps S4-S8 of block B are executed by a programmed software application, a so called "app", running on the processor 22 of the mobile communication device 2, which ensures that the reference information and the image 23 of the document(s) 4 are captured in one process of "non-separable" or "non-omittable" steps, in the sense that all steps must be performed for the process to be complete. Nevertheless, one skilled in the art will understand that the sequence of capturing the visual representation 12 in step S4 and capturing the document 4 in step S7 could be altered, for example.

Figure 1:
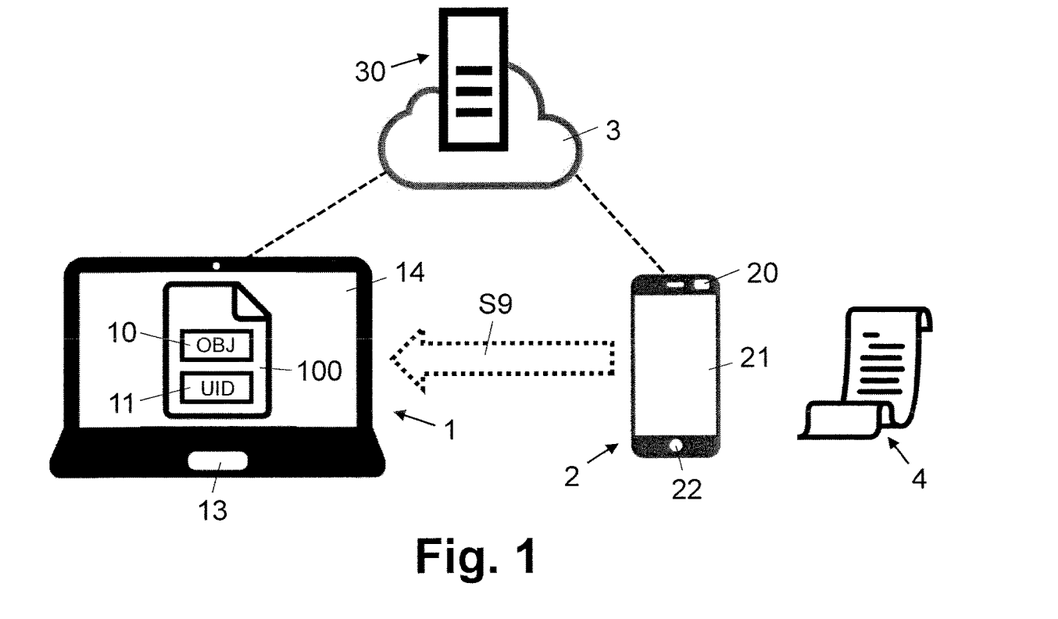
FIG. 1: shows a block diagram illustrating schematically a computer system for recording data and documents for a person.

In step S9, the data package is transferred from the mobile communication device 2 to the computer system 1. As illustrated schematically in FIGS. 2-4, in step S9, the data package is transferred via communications network 3. Alternatively, if the mobile communication device 2 is located close to the computer system 1, as indicated in FIG. 1, in step S9, the data package is transferred via a close range communication interface, such as NFC (Near Field Communication), RFID (Radio Frequency IDentification), Bluetooth, Bluetooth Low Energy, or the like. The data package is transferred via communications network 3 through the cloud-based center 30 or via peer-to-peer protocols. Depending on the embodiment, the mobile communication device 2 uses the addressing element to transfer the data package to the cloud-based computer center 30. Specifically, the mobile communication device 2 uses the URL or another link included in the addressing element to transfer the data package to the cloud-based computer center 30. At the cloud-based computer center 30, the data package is stored, e.g. in a data store or related to an application defined by the addressing element. In the case of a peer to peer network, the cloud-based computer center 30 is configured to facilitate a connection between the mobile communication device 2 and the computer system 1, e.g. by performing discovery, directory and/or hand-shake services, enabling the mobile communication device 2 to transfer the data package via communications network 3 to the computer system 1, without the need to store the data package at the cloud-based computer center 30.

From the cloud-based computer center 30, the data package is transferred to the computer system 1. Depending on the embodiment and/or configuration, the computer system 1 polls the cloud-based computer center 30, e.g. periodically or per operator request, for data packages associated with the computer system 1 and/or the respective person, as defined by the non-encrypted reference information; or the cloud-based computer center 30 forwards the data package to the computer system 1 defined by the non-encrypted reference information.

In step S10, the computer system 1 extracts the image(s) of the document(s) 4 and the reference information from the data package. In case the image(s) of the document(s) 4 and/or the reference information are encrypted, the computer system 1 uses its secret private cryptographic key for decryption of the document 4 and/or the reference information, respectively.

In step S11, the computer system 1 stores the image(s) of the document(s) 4 in the data store 100 linked to the data object 10 defined by the reference information extracted from the data package. In other words, the computer system 1 uses the reference information extracted from the data package to store the image(s) of the document(s) 4 in the data store 100 linked to the respective person. In short, the computer system 1 stores the image(s) of the document(s) 4 in the data store 100 linked to the respective person.

It should be noted that, in the description, the computer program code has been associated with specific functional modules and the sequence of the steps has been presented in a specific order. One skilled in the art will understand, however, that the computer program code may be structured differently and that the order of at least some of the steps could be altered, without deviating from the scope of the invention. For example, one skilled in the art will understand that the sequence of capturing the visual representation 12 in step S4 and capturing the document 4 in step S7 could be altered.

What is claimed is:

1. A computer-implemented method of recording data and documents for a person, the method comprising:

linking, in a computer system, a data object to a person identifier of the person;

generating, in the computer system, a visual code, the visual code encoding reference information for identifying the data object linked to the person identifier;

generating a visual representation of the visual code;

storing in a mobile communication device the reference information encoded in the visual code and captured from the visual representation of the visual code, using a camera of the mobile communication device;

generating, in the mobile communication device a data package, the data package including the reference information captured from the visual representation of the visual code and an image of a document of the person;

transferring the data package from the mobile communication device to the computer system; and storing, in the computer system, the image of the document, received in the data package, linked to the data object, defined by the reference information received in the data package.

2. The method of claim 1, wherein generating in the mobile communication device the data package comprises encrypting at least a part of the data package using a public cryptographic key provided by the computer system.

3. The method of claim 2, wherein generating the visual code in the computer system comprises encoding in the visual code a public cryptographic key; and the method further comprises storing in the mobile communication device the public cryptographic key encoded in the visual code.

4. The method of claim 1, wherein generating the visual code in the computer system comprises encoding in the visual code an addressing element; and the method further comprises using the addressing element for transferring the data package from the mobile communication device to the computer system.

5. The method of claim 1, wherein transferring the data package from the mobile communication device to the computer system comprises transmitting the data package from the mobile communication device to a cloud-based processing center, and transmitting the data package from the cloud-based processing center to the computer system.

6. The method of claim 1, further comprising capturing the image of the document of the person, using at least one of: a camera of the mobile communication device and a scanner; and storing in the mobile communication device the image of the document of the person.

7. The method of claim 1, wherein generating the visual representation of the visual code comprises at least one of: displaying the visual representation and printing the visual representation of the visual code.

8. A computer system for recording data and documents for a person, the computer system comprising one or more processors configured to perform the steps of:
   linking, in the computer system, a data object to a person identifier of the person;
   generating, in the computer system, a visual code, the visual code encoding reference information for identifying the data object linked to the person;
   generating a visual representation of the visual code to enable a mobile communication device to capture the reference information encoded in the visual code, using a camera of the mobile communication device;
   receiving, in the computer system, a data package from the mobile communication device;
   extracting, in the computer system, from the data package an image of a document of the person and the reference information extracted by the mobile communication device from the visual representation of the visual code; and
   storing, in the computer system, the image of the document, extracted from the data package, linked to the data object, defined by the reference information extracted from the data package.

9. The computer system of claim 8, wherein the one or more processors are further configured to use a private cryptographic key of the computer system to decrypt contents of the data package encrypted by the mobile communication device using a public encryption key of the computer system.

10. The computer system of claim 9, wherein the one or more processors are further configured to encode in the visual code the public cryptographic key of the computer system, enabling the mobile communication device to encrypt at least a part of the data package using the public cryptographic key of the computer system.

11. A computer program product comprising a non-transient computer-readable medium having stored thereon computer program code configured to control a processor of a computer system such that the computer system performs the steps of:
   linking, in the computer system, a data object to a person identifier of a person;
   generating, in the computer system, a visual code, the visual code encoding reference information for identifying the data object linked to the person;
   generating a visual representation of the visual code to enable a mobile communication device to capture the reference information encoded in the visual code, using a camera of the mobile communication device;
   receiving, in the computer system, a data package from the mobile communication device;
   extracting, in the computer system, from the data package an image of a document of the person and the reference information extracted by the mobile communication device from the visual representation of the visual code; and
   storing, in the computer system, the image of the document, extracted from the data package, linked to the data object, defined by the reference information extracted from the data package.

12. A mobile communication device, comprising a camera and a processor connected to the camera and configured to perform the steps of:
   capturing reference information, using the camera of the mobile communication device, from a visual representation of a visual code, generated by an external computer system separate from the mobile communication device for defining in the external computer system a data object linked to a person;
   generating, in the mobile communication device, a data package, the data package including the reference information captured from the visual representation of the visual code and an image of a document of the person; and
   transferring the data package from the mobile communication device to the external computer system, enabling the external computer system to store the image of the document of the person in the external computer system linked to the data object defined by the reference information included in the data package.

13. The mobile communication device of claim 12, wherein the processor is further configured to encrypt at least a part of the data package using a public cryptographic key of the external computer system.

14. The mobile communication device of claim 13, wherein the processor is further configured to extract the public cryptographic key of the external computer system from the visual representation of the visual code generated by the external computer system.

15. A computer program product comprising a non-transient computer-readable medium having stored thereon computer program code configured to control a processor of a mobile communication device such that the mobile communication device performs the steps of:
   capturing reference information, using a camera of the mobile communication device, from a visual representation of a visual code, generated by an external computer system separate from the mobile communication device for defining in the external computer system a data object linked to a person;
   generating, in the mobile communication device, a data package, the data package including the reference information captured from the visual representation of the visual code and an image of a document of the person; and
   transferring the data package from the mobile communication device to the external computer system, enabling the external computer system to store the image of the document of the person in the external computer system linked to the data object defined by the reference information included in the data package.

* * * * *